Oct. 2, 1928.
J. E. KENNEDY ET AL
1,686,089
TIRE PROTECTING SIGNAL
Filed Aug. 17, 1925
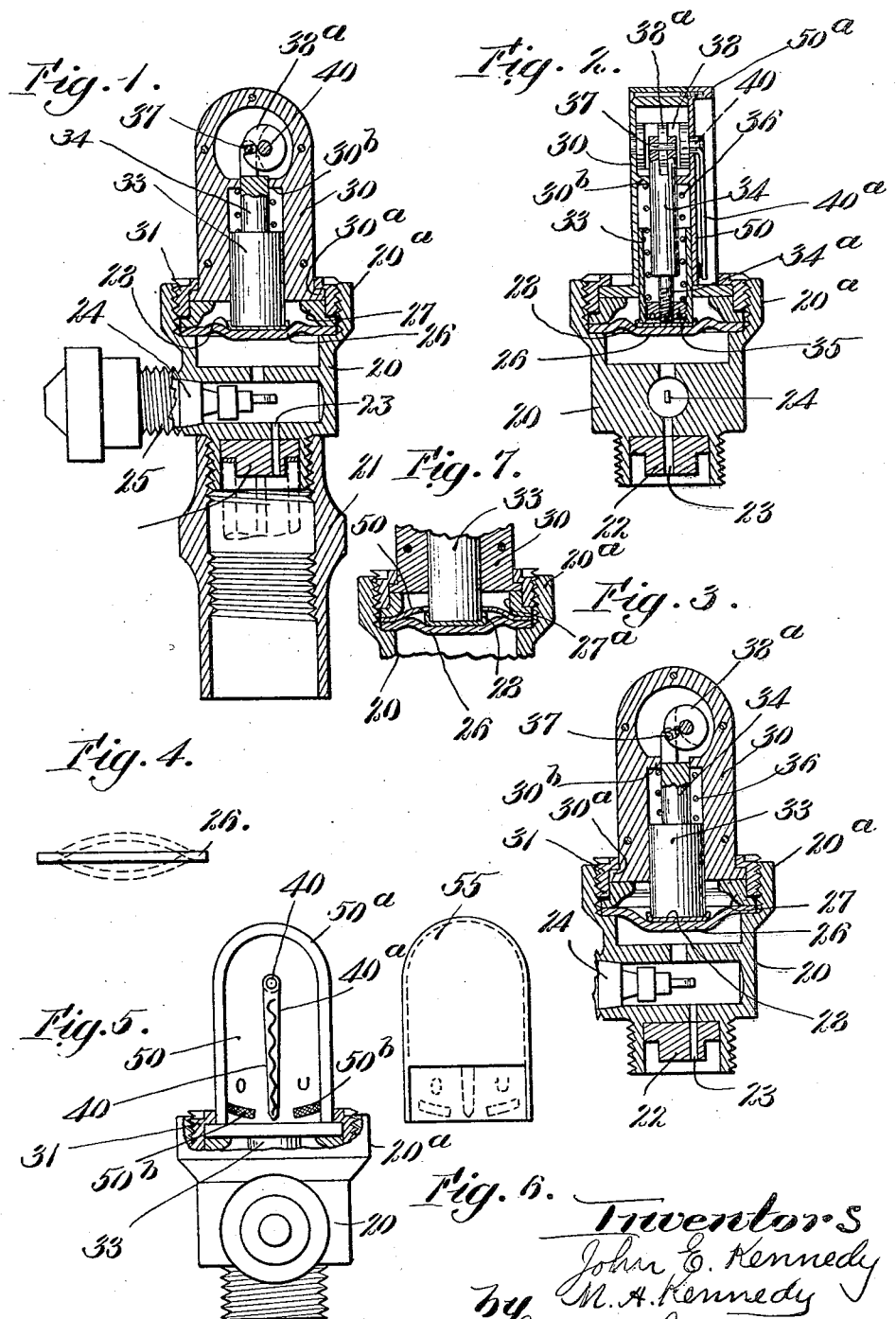
Inventors
John E. Kennedy
M. A. Kennedy
by Geo. N. Goddard Atty.

Patented Oct. 2, 1928.

1,686,089

UNITED STATES PATENT OFFICE.

JOHN E. KENNEDY AND MICHAEL A. KENNEDY, OF LOS ANGELES, CALIFORNIA.

TIRE-PROTECTING SIGNAL.

Application filed August 17, 1925. Serial No. 50,576.

This invention relates to protection of pneumatic tires against over inflation or under inflation, either of which is highly objectionable and especially so in the case of so called balloon tires whose characteristic features are low air pressure and thin flexible walls.

The use of the ordinary tire pressure gauges that are applied successively to each tire require the removal and replacement of each dust cap and the careful reading of a more or less finely graduated scale when it is applied to each tire, hence the motorist will seldom trouble to test his tires with such a gauge except possibly as he occasionally inflates a tire, which he sees has gone nearly flat.

The present invention is intended to provide a permanently attached signal of such marked visibility that a mere glance at the tire from a moderate distance will warn him that any over-inflated or under-inflated tire is in such condition as to need attention.

Since in the case of balloon tires a relatively small change from the standard normal air pressure for a given tire may be seriously detrimental to the tire if used without correction, and such a small change is attended with but a small movement of an air-resisting plunger, we have devised a special tire signal device that is accurately sensitive to small changes in air pressure and at the same time is combined with a multiplying indicator having a sufficient range of movement to give markedly conspicuous indication of even a small degree of over-inflation or of under-inflation, as the case may be, our arrangement being such that it is not adversely affected by road shocks or vibration and is free from aberrations or derangements caused by exposure to the dirt, dust, water encountered when traveling on the road, a consideration of great practical importance, in this class of devices.

Broadly speaking the invention comprises a yieldingly movable air-resisting and air-actuated plunger mounted in a casing adapted to be permanently attached to the stem of a pneumatic tire, and operatively connected with an oscillatory indicator of sufficient radial length to move through an arc of substantially greater length than the distance its actuating plunger travels to its different positions of balance, which are indicated by the multiplying indicator.

A feature of practical importance is that this multiplying indication is accomplished without danger of air leakage through the device, while avoiding the frictional resistance due to a tight fitting piston or the inaccuracies involved in the use of a distensible tube of elastic rubber or other material which is subject to deterioration when kept under stress.

These and other features of the invention will be described in the following specification and will be defined in the claims hereto annexed.

In the accompanying drawings I have illustrated a simple, convenient and reliable construction and arrangement embodying the principles of this invention, in which:

Figure 1 is a vertical central section of the device ready for application to a pneumatic tire.

Figure 2 is a cross section taken at right angles to the plane of Figure 1, the coupling member being omitted.

Figure 3 is a view, similar to Figure 1, showing the position of parts when the tire is under-inflated.

Figure 4 is a detail of the flexible air-sealing diaphragm.

Figure 5 is a front elevation of the device.

Figure 6 is a front elevation of a protective cap or cover adapted to be applied thereto.

Figure 7 is a detail in central section showing a modification of the diaphragm guide.

In the practice of this invention, according to the form illustrated, we employ a hollow body 20, providing a compressed air chamber, which is adapted to be permanently but detachably coupled to the stem of a pneumatic tire, communication for the admission of air being provided by the air passage 23 through the internal boss 22, which projects far enough inside the tire nipple to unseat the tire valve.

A lateral nipple 25, controlled by any usual form of check valve 24, serves to permit the inflation of the tire without removing the signal device from the tire stem.

An indicator casing 30 is secured to the internally threaded flange 20ª of the body member 20, by means of a spanner ring nut 31 which overlaps a shoulder or flange 30ª, and through an interposed washer 27 firmly clamps the peripheral portion of a disk-like flexible diaphragm 26 tightly to its annular seat formed inside the body 20.

This diaphragm 26 is preferably made of slightly larger diameter than the interior seat so that when the diaphragm 26 is secured in place, it assumes a bowed or cup form, as indicated in the lower dotted lines of Figure 4. This allows the diaphragm to move from bowed position on one side of the central plane to bowed position on the other side without depending upon the stretch of the diaphragm, so that there is no deterioration due to its being maintained under tension, and the elasticity or stretch of the diaphragm is not a factor affecting the correct indication of pressure.

For the pressure-indicating scale we provide a hollow plunger or sleeve 33 adapted to slide inside the longitudinal bore of the casing 30, but not with a snug enough fit to afford appreciable frictional resistance, and in the bottom or lower end, as the device is illustrated in the drawing, is inserted a tension adjusting spanner nut 35, which has peripheral engagement with the internal threads in the lower end of the sleeve 33 and has internal threaded engagement with the reduced threaded lower end 34ª of a plunger 34, both internal and external threads of the nut being of the same pitch so that the relative positions of the interior plunger or spindle 34 with the plunger sleeve 33, is not affected when the nut is screwed up or down to vary the tension of the helical spring 36, which is inserted in the annular space between the spindle 34 and the sleeve 33. This helical spring is of predetermined strength and is disposed so that its upper end thrusts against a transverse ledge 30ᵇ of the casing 30, which ledge is centrally perforated to afford a guiding bearing for the upper end of the plunger or spindle 34. The downward thrust of the spring against the nut presses the lower end of the plunger against the diaphragm 26 to yieldingly oppose and counterbalance the air pressure on the under side of said diaphragm.

As this device is not intended for a pressure gauge that will show considerable variations in pressure, and is intended to indicate small variations in pressure with a high degree of visibility to render such change indications easily discernable from a distance, we have provided what may be termed a multiplying signaling or indicating means affording a relatively large range of movement of the indicator in correlation with slight changes of position of the actuating plunger.

To this end the upper end of the plunger is slotted to receive a thin disk-like wing 38ª of a rotative arbor 38, said wing being notched peripherally to receive a transverse pin 37 secured in the upper end of the plunger. The reduced front end 40 of this arbor carries a pointer 40ª of such length that the movement of the end of the pointer, with relation to conspicuous display signal devices, will extend through a substantially greater range or arc of movement than the actual axial movement of the plunger itself.

The indicator casing is provided with a front plate or cover 50, preferably provided with a peripheral raised edge or protective ledge extending out beyond the face of the pointer so that the pointer may be left exposed to view, while guarded against any external side-swiping.

In correlation with the pivoted pointer 40ª, we employ appropriate display signals markedly contrasting in appearance both with the pointer and with the exposed surface of the cover 50, which forms the background for the pointer. Preferably these conspicuous display signals are in the form of an interrupted rib having a gap at is middle portion over which the end of the pointer will stand when the tire pressure is at the normal standard for a given tire carrying a given load. In Figures 1 and 2 the diaphragm and plunger stand approximately in the position which is appropriate to indicate correct normal pressure for the tire. In Figure 3 the diaphragm and the plunger are shown in a position of partial deflation which would result in moving the pointer to the right hand display portion of the signal-indicating plate which is marked with the minus or other symbol indicative of under-inflation. An excessive pressure will similarly be noted by the swing of the pointer to the left hand display signal marked with the plus or other time-pressure indication.

To protect the diaphragm from being cut by the lower edge of the sleeve member of the plunger, we preferably employ a covering disk 28 which is interposed between the diaphragm and the lower end of the sleeve.

It will be seen that this device is practically adapted for permanent attachment to the tire since it will not be adversely affected by the vibration and road shock to which it is subjected, yet it is sensitive to slight changes in pressure of which it gives a multiplied or magnified indication readable at a distance. It is not affected by any appreciable frictional resistance which will change with wear, nor is it dependent upon the elasticity or stretch of rubber, the co-efficient of which changes when rubber is kept constantly in a stretched condition. The construction is such that its action is not impaired by accumulation of dust, and it may still further be protected by means of a cover or cap 55 which can be forced on over the indicator casing with its lower end opposite the pointer and signaling indicia entirely opened or closed by a transparent panel. As the indicating signal is secured to the body by a connection permitting rotative adjustment, the face of the indicator may be always set to face outwardly when applied to the wheel, and yet secure a perfectly tight seating of the air-sealing diaphragm.

The clamping washer 27 forms interiorly a guard to sustain the buckled up edge part of the free portion of the diaphragm 26 to limit its upward bowing action and prevent it from embracing or surrounding the lower end of the plunger sleeve 33 or of its closing cap or disk 28. In case a diaphragm of fairly large diameter be used I prefer to use a separate dished or concavo-convex guard washer or member 50 having a central opening just large enough to allow the sleeve 33 and its cap 28 to pass through, thus more effectually, in that case, serving to prevent the slack of the diaphragm from hugging the lower end of the sleeve and its cap.

What we claim is:

1. A visual safety signal for a pneumatic tire embracing an air-tight casing having a laterally valved air inlet adapted to be secured to a tire stem by a permanent airtight coupling, a piston casing secured to the outer end of the said air casing, an imperforate air-confining diaphragm of pliable air-tight fabric secured across the open end of the air-tight casing to confine the air therein, said diaphragm having sufficient fullness, when secured in place, to allow it to bulge on either side of a medial plane without stretching, an extensible piston member comprising inner and outer elements adjustably secured together, a helical compression spring normally acting to thrust the inner end of said piston in counter-balancing resistance against the interior portion of the outer face of said diaphragm, means for guarding the inner end of said piston against gripping action around its periphery on the part of the diaphragm when the latter is bulged outwardly by air pressure, and an exterior pointer associated with two widely spaced distantly visible signal members indicative, respectively, of over-inflation and under-inflation of the tire, said pointer being actuated to move between said signal members according to the pressure counter-balancing position of said piston.

2. A visual safety signal for pneumatic tires embracing in combination a hollow casing adapted to be permanently secured to a tire stem to maintain constant communication with the tire and having a lateral valved air-supply port, a piston casing adapted to be secured to the open end of said hollow casing, an imperforate diaphragm of soft pliable material having its peripheral portion tightly pinched between the two casings when they are secured together end to end to prevent passage of air from one to the other, a spring-pressed piston slidably mounted in the piston casing and resting loosely against said imperforate diaphragm to oppose a counter-balancing resistance to varying degrees of air pressure against the opposite side of said diaphragm, and an external pointer correlated with two contrasting signal bands of high visibility to render them conspicuous at a distance, said pointer being operatively connected with the piston to be moved to and fro as the tire pressure rises or falls to give indication, visible at a distance, of the over-inflation or under-inflation of the tire.

3. In a device of the class described, the combination of an air-tight casing adapted to be secured to a tire stem and maintain constant communication with the tire, an imperforate air-confining diaphragm of pliable material secured across the open end of said casing to confine the air therein, a piston casing secured on the opposite side of said diaphragm, and a spring-pressed piston arranged to oppose counter-balancing pressure against the outer face of said diaphragm, said piston comprising inner and outer co-axial members adjustably secured one to the other, one resting upon the diaphragm and the other having operative connection with an indicating pointer, said pointer being mounted exteriorly of the piston casing.

4. In a device of the class described, the combination of two casing members secured end to end, an imperforate air-confining diaphragm interposed between said two casings, a spring-pressed piston resting against the outer face of said diaphragm and comprising inner and outer members adjustably connected together by an interposed spring-supporting and tensioning nut arranged to vary the tension of the spring without varying the relative position of the two casing members, and a pointer operatively connected with one of said piston members to visually indicate in relation to signals visible at a distance variations in tire pressure.

5. In a device of the class described, the combination with a valve air-pressure chamber adapted to contain constant communication with the tire stem, a piston chamber secured thereto, an imperforate diaphragm preventing the passage of air from one casing to the other, an indicating pointer mounted on the piston casing to indicate at a distace from the tire over-inflation or under-inflation of the tire, and a piston resting upon said diaphragm, said piston comprising extensibly adjustable members connected by a tensioning nut so as to vary either the effective length of the piston or the tension of the spring without one adjustment affecting the other, substantially as described.

In witness whereof, we have subscribed the above specification.

JOHN E. KENNEDY.
M. A. KENNEDY.